United States Patent [19]
Feichtinger

[11] Patent Number: 6,098,295
[45] Date of Patent: Aug. 8, 2000

[54] ANGULAR ENCODER

[75] Inventor: Kurt Feichtinger, Palling, Germany

[73] Assignee: Dr. Johannes Heidenhain GmbH, Traunreut, Germany

[21] Appl. No.: 09/193,831

[22] Filed: Nov. 17, 1998

[30] Foreign Application Priority Data

Nov. 18, 1997 [DE] Germany .................... 197 51 019

[51] Int. Cl.$^7$ ............................................. G01B 5/24
[52] U.S. Cl. ................................ 33/1 PT; 33/706
[58] Field of Search ........................ 33/1 PT, 1 N, 33/706, 707, 708, 534, 614, 617, 618, 620, 621

[56] References Cited

U.S. PATENT DOCUMENTS

| | | | |
|---|---|---|---|
| 4,060,903 | 12/1977 | Ernst | 33/706 |
| 4,259,904 | 4/1981 | Metje | 33/618 |
| 4,530,157 | 7/1985 | Nelle | 33/707 |
| 4,776,098 | 10/1988 | Nelle | 33/706 |
| 4,912,856 | 4/1990 | Ernst | 33/707 |
| 5,152,066 | 10/1992 | Rieder et al. | 33/1 PT |
| 5,758,427 | 6/1998 | Feichtinger et al. | 33/1 PT |
| 5,771,594 | 6/1998 | Feichtinger | 33/1 PT |

FOREIGN PATENT DOCUMENTS

| | | |
|---|---|---|
| 0105119 | 8/1983 | European Pat. Off. . |
| 0169189 | 7/1985 | European Pat. Off. . |
| 272698 | 5/1988 | German Dem. Rep. . |
| 2712421 | 9/1978 | Germany . |
| 7907900 | 3/1979 | Germany . |
| 3715908 | 12/1988 | Germany . |

OTHER PUBLICATIONS

Alfons Ernst, "Digitale Langen–und Winkel Mestechnik" (Digital Linear and Angular Measurement Technology), Technical Library, vol. 34, pp. 60–61 (1989). (German).

*Primary Examiner*—Diego F. F. Gutierrez
*Assistant Examiner*—Stanley J. Pruchnic, Jr.
*Attorney, Agent, or Firm*—Brown & Wood, LLP

[57] ABSTRACT

An angular encoder including a flexible measurement tape having a graduation and secured to a sector of a convex or concave, as the case may be, circumferential surface of a support, a scanning head for scanning the graduation of the measurement tape and two tensioning or pressure devices provided at opposite ends of the measurement tape, dependent on whether the measurement tape abuts a convex or concave circumferential surface, respectively, which apply to the two ends of the measurement tape equal tensioning or pressure forces acting in opposite directions, respectively.

8 Claims, 3 Drawing Sheets

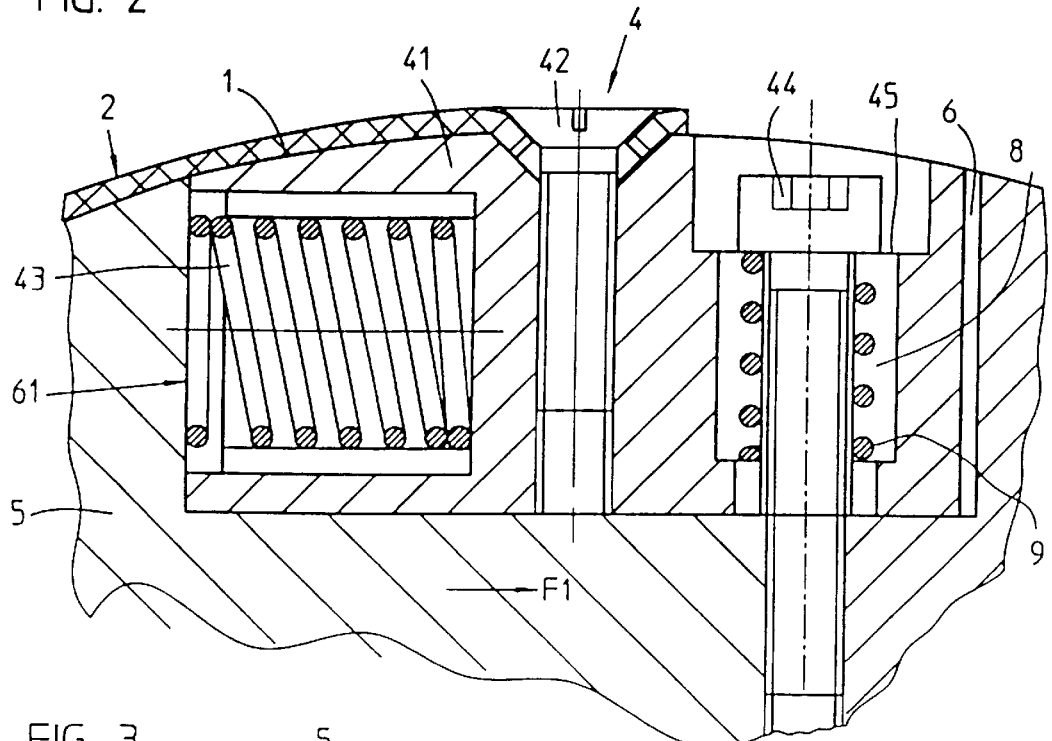
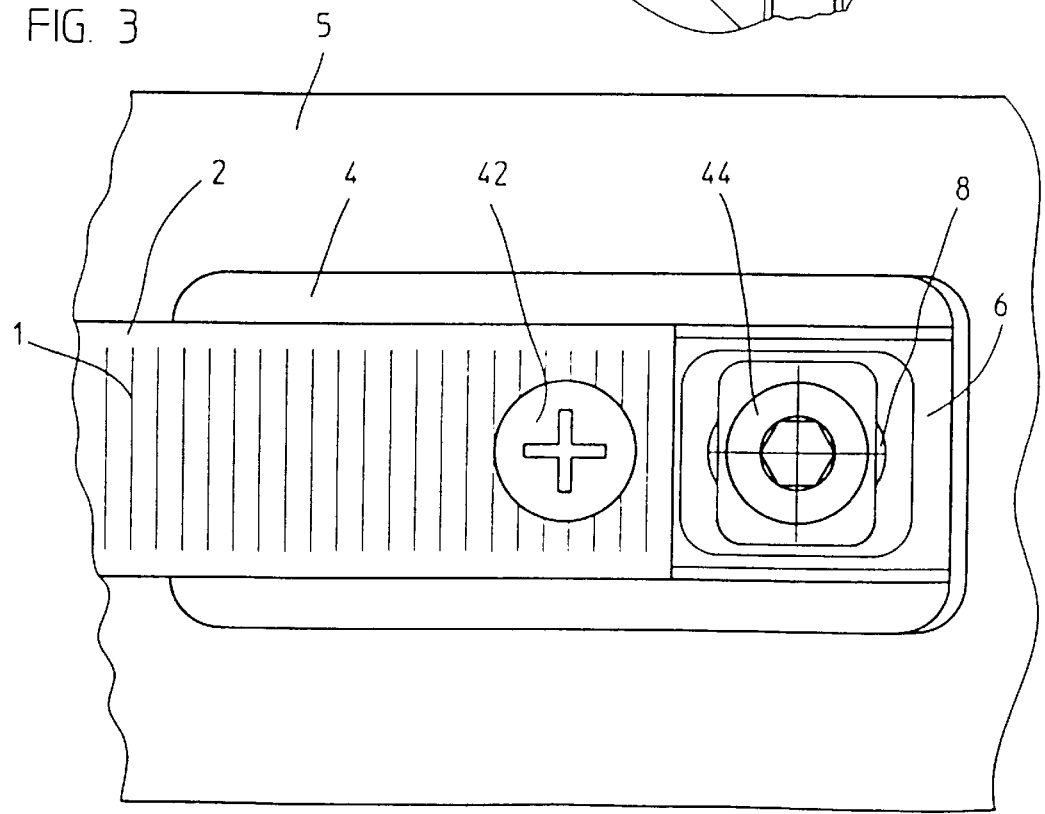

ANGULAR ENCODER

BACKGROUND OF THE INVENTION

1. Field of the Invention

The present invention relates to an angular encoder including a flexible measurement tape having a graduation and secured to a sector of a convex or concave, as the case may be, circumferential surface of a support, and a scanning head for scanning the graduation of the measurement tape.

2. Description of the Prior Art

In angular encoders of the above-described type, the flexible measurement tape is glued to the circumferential surface of the support. At that, the tape is fixedly held at one end and is wrapped around an appropriate region of the convex or concave support surface. The friction between the support surface and the measurement tape leads to different stress ratios along the tape. The stress at the first, fixedly secured end is minimal, as a result of a stationary friction, and the stress increases toward the other end of the measurement tape. The deviation of the incremental graduation changes along the measurement tape in accordance with the changes of the stress ratios.

A measurement tape with the unfavorable stress ratios is disclosed, e.g., in German Publication DE 37 15 908 A1. In the encoder disclosed in this publication, a flexible measurement tape has its both ends secured on convexly curved support with magnetic holders or with suction cups. The present invention is directed to an improvement of the angular encoder disclosed in DE 37 15 908 A1.

Alfons Ernst in his book "Digitale Langen-und Winkel Messtechnik" (Digital Linear and Angular Measurement Technology), Technical Library, Volume 34, 1989, p.p. 60–61, describes an angular encoder in which a steel tape with an incremental graduation is tensioned around a circumference of a rotary table. The tape ends are welded to clamping cleats which are formed so precisely that upon mounting the tape on the rotary table, they need only be screwed together. The tensioning cleats insure a precise abutment of the tape ends with each other. However, this securing of a measurement tape is possible only about a circumference of 360°.

Several publications, e.g., German Patent No, 2,712,421 and European Publications EP 0 105 119 B1 and EP 0 169 189 B1, disclose a linear encoder in which a flexible measurement tape is fixed to a support at one of its ends, with the other end being tensioned with a tensioning device. In these encoders, the tensioning device includes a spring and a straining screw for adjusting the tape length.

German Utility model DE 79 07 900 discloses a linear encoder including a linear elongate scale at each of the opposite ends of which a correction device is provided. The correction device can be formed as a stretching or tensioning device or as a submerging device. The measurement tape in this encoder is supported on a flat surface of a hollow body.

In linear encoders, no wrapping-around of a tape takes place, which influence the stress ratios dependent on a wrap-around angle.

Accordingly, an object of the present invention is to provide an angular encoder with a flexible measurement tape supported on a convexly or concavely curved support and which is easily mountable thereon.

Another object of the present invention is to provide an angular encoder with a flexible measurement tape in which the friction ratios and, thus, the stress and tension ratios of a measurement tape are significantly improved in comparison with known solutions.

SUMMARY OF THE INVENTION

These and other objects of the present invention, which will become apparent hereinafter, are achieved by providing, at the two opposite ends of the flexible measurement tape, tensioning or pressure devices, dependent on whether the measurement tape abuts a convex or concave circumferential surface, respectively, which apply to the two ends of the measurement tape equal tensioning or pressure forces acting in opposite directions, respectively.

The advantage of the present invention consists in that a measurement tape can be directly mounted on an available curved machine component the position of which need be measured. A particular advantage of the present invention consists in that the approximately uniform stress conditions of the tape permit to even to a most possible extent the non-uniform friction (rope friction) resulting from wrapping the tape around a curved circumferential support.

BRIEF DESCRIPTION OF THE DRAWINGS

The features and objects of the present invention will become more apparent, and the invention itself will be best understood from the following detailed description for the preferred embodiments when read with reference to the accompanying drawings, wherein:

FIG. 2 shows a cut-out A in FIG. 1 at an increased scale;

FIG. 3 shows a plan view of the cut-out A;

DETAILED DESCRIPTION OF THE PREFERRED EMBODIMENTS

Figure 1:
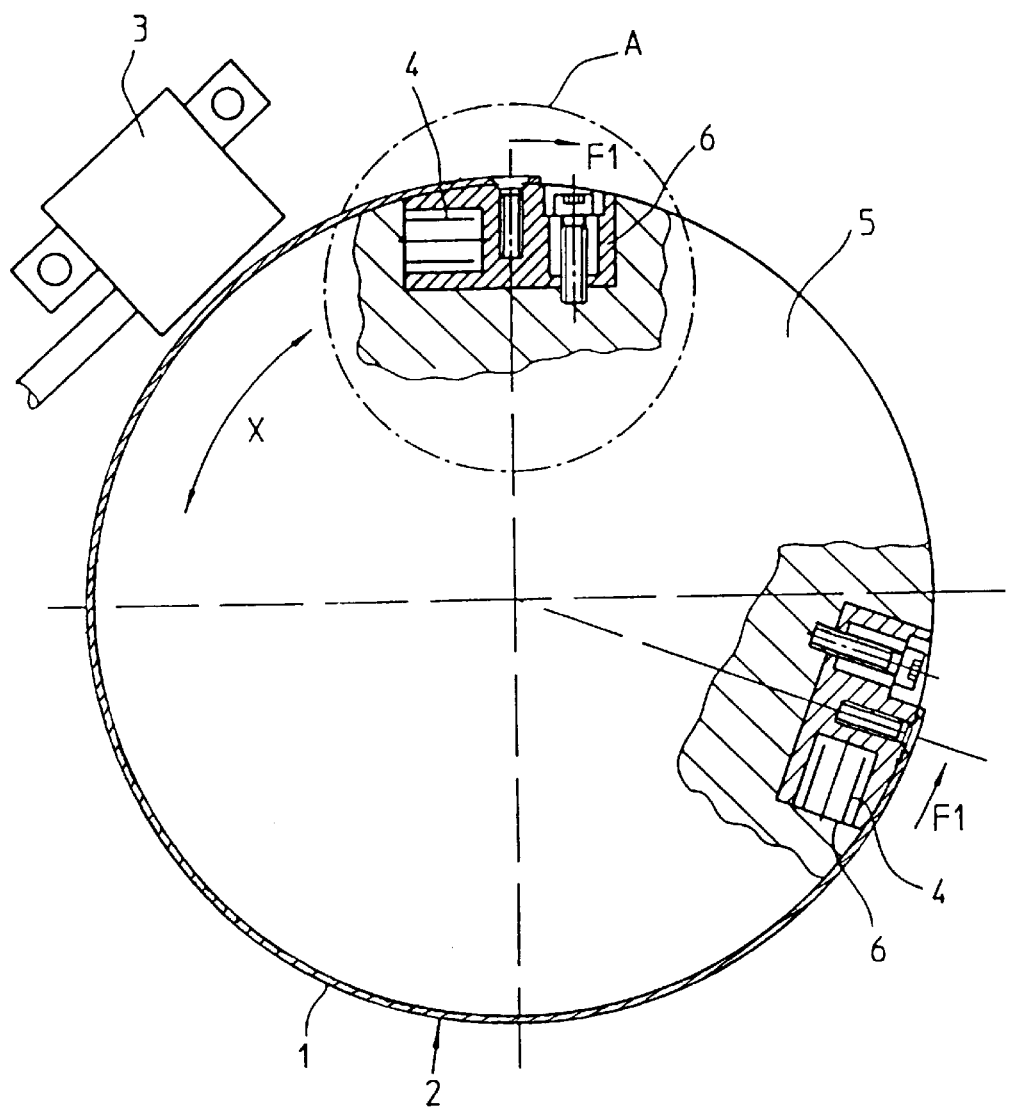
FIG. 1 shows a partially cross-sectional view of a first embodiment of an angular encoder according to the present invention.

An angular encoder according to the present invention, which is shown in FIG. 1, includes a flexible measurement tape, in particular, steel tape on the surface of which an incremental graduation 2 is provided in a conventional manner. For scanning the graduation 2, a scanning head 3 is provided. The scanning head 3 is secured to one part, and the measurement band 1 is secured on a second part which rotates relative to the one or first part. In the embodiment shown in FIG. 1, the second part is formed as a rotary table which serves as a round support 5 having a convex circumferential surface.

According to the invention, at opposite ends of the measurement tape 1, there are provided two devices 4, respectively, which at least during mounting of the measurement tape 1, permit displacement of both ends of the measurement tape 1 relative to the support 5. The device 4 is shown in detail in FIGS. 2 and 3. The device 4 functions as a tensioning device. The device 4 includes a base body 41 to which an end of the measurement tape 1 is secured. The attachment of the tape can be effected with a screw 42 or by welding or riveting. The device 4 also includes a compression spring 43, which provides for tensioning and the displacement of the tape end, and a securing member 44 for securing the base body 41 to the support 5.

In order to facilitate mounting of the measurement tape 1 on the convexly curved base body 41, a cavity 6 for receiving the tensioning device 4 is formed in the support 5 in the regions of the ends of the measurement region. The depth of the cavity 6 is so selected that the measurement device 4 is completely submerged therein. The advantage of the tensioning device 4 being completely submerged consists in that the scanning head 3 can be displaced over the region of the tensioning device in the measurement direction X.

Providing of the cavity 6 results in another advantage which consists in that a surface 61, which extends transverse to the measurement direction X can be used for supporting a portion of the tensioning device. In the embodiment shown in FIGS. 1–3, the compression spring 43 is supported against the surface 61, biasing the base body 41 of the tensioning device 4 away from the surface 61. The tensioning force, which is applied by the compression spring 43 to the measurement tape 1, is designated with a reference sign F1.

For clarity sake, the displacement of the tensioning device in the cavity 6 is shown only in FIGS. 2–3.

It is also possible to provide the leftside end of the compression spring 43 with a support displaceable relative to the base body 41 in the measurement direction X. In this case, the support will be supported against the surface 61.

The tensioning forces of both tensioning devices 4 are equal and act in opposite directions.

Instead of the compression spring 43, a tension string (not shown) can be used. However, the advantage of using a compression spring 43 consists in that surface 61 can be provided for supporting the compression spring 43 and that the screw 44, which is necessary for securing the tensioned measurement tape on the support 5, can be provided at the free end of the tensioning device 4.

The base body 41 can be provided with a bore 8 for securing the base body 41 and, thus, the end of the measurement tape 1, with the screw 44 to the support 5. Advantageously, the size of the bore 8 is so selected that the base body 41 can be displaced relative to the screw 44 in the measurement direction during the mounting process. The bore 8 is formed as a longitudinal bore the axis of which extends transverse to the measurement direction X.

A compression spring 9 is provided between the head of the screw 44 and the base body 41. The compression spring 9 is only active during the mounting process. It presses the base body 41 into the cavity 6 in the support 5 while enabling the displacement of the base body 41 relative to the screw 44 in the measuring direction X. In the mounted condition of the tape 1, the compression spring 9 becomes non-operational as the screw 44 directly cooperates with a surface 45 of the base body 41. The screw 44 is screwed in until the head of the screw 44 engages the surface 45, and the base body 41 becomes fixed to the support 5.

Figure 4:
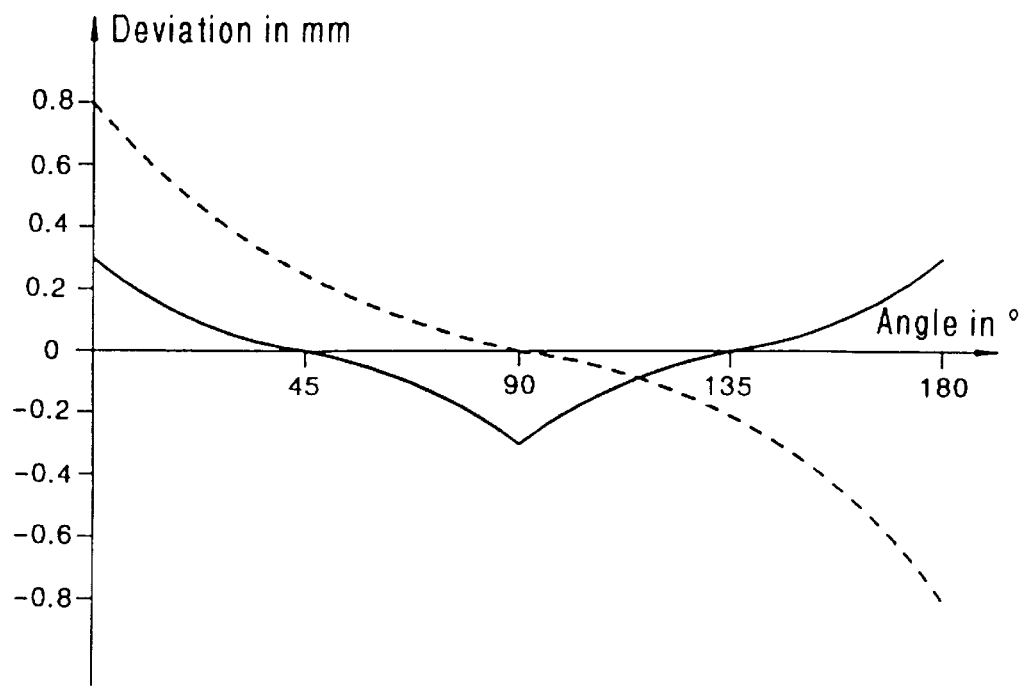
FIG. 4 shows a course of the tape error.

FIG. 4 shows how the novel features of the present invention influence the frictional behavior and thus the tensioning of the measurement tape 1. To simplify the illustration, a wrap-around angle of 180° is assumed. The continuous curve shows the deviation of the measurement tape 1 dependent on the wrap-around angle. In comparison, the dash line shows the deviation of a conventional or prior art measurement tape, i.e., of a measurement tape which is rigidly fixed at one end (180°) and is wrapped around the circumferential surface of its support until 0°. It can be clearly seen that the present invention reduces the deviation by more than 50% as a result of the wrap-around according to the present invention. The generated uneven expansion behavior resulting from the tape being wrapped-around the support (rope friction) is eliminated to a most possible extent. These advantages are achieved not by a corrective stretching of the measurement tape, as in linear encoders, but rather by providing for mobility of both ends of the measurement tape 1 relative to the support 5 during mounting of the tape.

Figure 5:
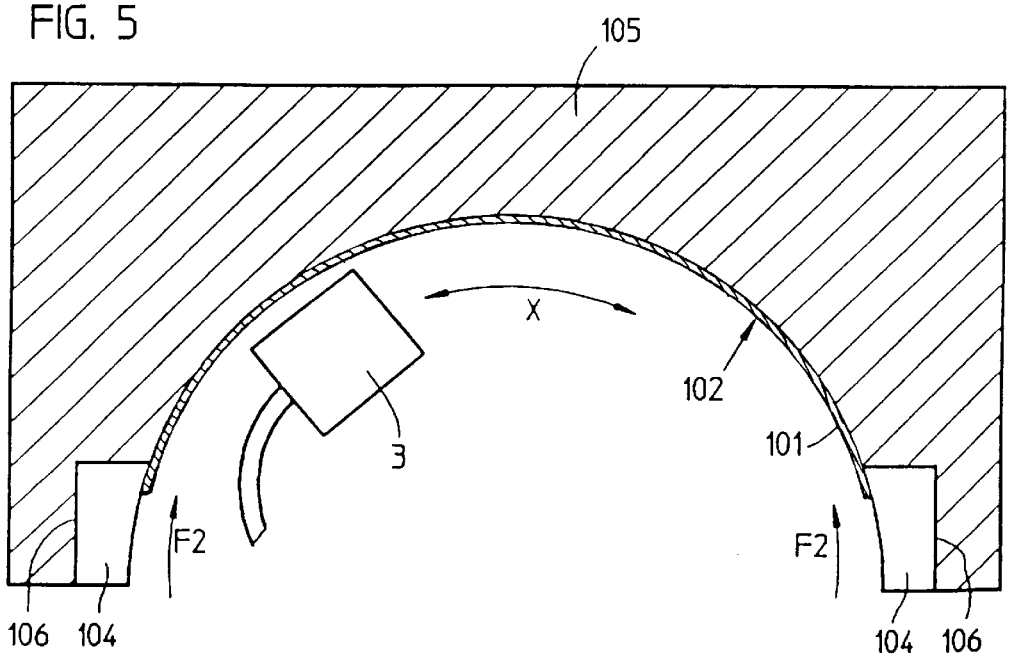
FIG. 5 shows a cross-sectional view of a second embodiment of an angular encoder according to the present invention.

The present invention retains it advantages also when used for mounting the measurement tape on concavely curved support, as shown schematically in FIG. 5. In FIG. 5, the measurement tape 101 is secured on the concavely curved surface of the support 105, with pressure devices 104 being provided at opposite ends of the measurement tape 101. Each pressure device 104 applies to a respective end of the tape 101 a pressure force F2 and insures the mobility of the respective end during mounting of the measurement tape 101. The friction ratios are thereby compensated over the entire tape length. The pressure forces F2 of the two pressure devices 104 are equal to each other and act in opposite directions.

It is particularly advantages when the pressure devices 104 are received in cavities 106 formed in the support 105 and do not extend beyond the concave circumferential surface of the support 105.

The pressure force F2 is obtained with a tension or compression spring. It is further advantageous when the spring is supported against a cavity surface which extends transverse to the measurement direction X.

In order to further improve the friction behavior based on the rope friction according to the present invention, an elastic layer can be provided between the circumferential surface of the support 5,105 and the measurement tape 1,101. This intermediate elastic layer can be formed as a glue layer or of a film of a viscous fluid. The glue layer can be so formed that it remains elastic during mounting of the tape and hardens only after mounting of the tape and the compensation of the friction ratios. When an intermediate layer is provided, the measurement tape 1,101 does not directly abut the circumferential surface of the support 5,105.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An angular encoder, comprising:
   a support having a convex circumferential surface;
   a flexible measurement tape abutting a sector of the convey circumferential surface of the support and provided with a graduation;
   a scanning head for scanning the graduation of the measurement tape; and
   two tensioning devices provided at opposite end of the measurement tape, respectively, for applying to the opposite ends of the measurement tape equal tensioning forces, respectively, acting in opposite directions.

2. An angular encoder as set forth in claim 1, wherein each tensioning device comprises a spring for generating a tensioning force.

3. An angular encoder as set forth in claim 1, wherein the support has two cavities for receiving the two tensioning devices, respectively, without any portion of the tensioning devices projecting beyond the convex circumferential surface of the support.

4. An angular encoder as set forth in claim 3, wherein each tensioning device comprises a base body to which a respective end of the measurement tape is secured, and a compression spring provided between the base body and a surface of a respective cavity extending transverse to the convex circumferential surface of the support.

5. An angular encoder as set forth in claim 4, wherein the compression spring is supported against the surface of the respective cavity.

6. An angular encoder, comprising:

a support having a concave circumferential surface;

a flexible measurement tape abutting a sector of the concave circumferential surface of the support and provided with a graduation;

a scanning head for scanning the graduation of the measurement tape; and two pressure devices provided at opposite end of the measurement tape, respectively, for applying to the opposite ends of the measurement tape equal pressure forces, respectively, acting in opposite directions.

7. An angular encoder as set forth in claim 6, wherein each pressure device comprises a spring for generating a pressure force.

8. An angular encoder as set forth in claim 6, wherein the support has two cavities for receiving the two pressure devices, respectively, without any portion of the pressure devices projecting beyond the concave circumferential surface of the support.

* * * * *